Nov. 18, 1958 YOICHIRO YANAGIDA 2,861,130

AUTOMATIC TELEPHONE CALLING APPARATUS

Filed July 10, 1953 6 Sheets-Sheet 1

YOICHIRO YANAGIDA
INVENTOR.

BY Wenderoth, Lind and Ponack

ATTYS.

AUTOMATIC TELEPHONE CALLING APPARATUS

Filed July 10, 1953 6 Sheets-Sheet 2

YOICHIRO YANAGIDA
INVENTOR.
BY Wenderoth, Lind and Ponack
ATTYS

Nov. 18, 1958 YOICHIRO YANAGIDA 2,861,130

AUTOMATIC TELEPHONE CALLING APPARATUS

Filed July 10, 1953 6 Sheets-Sheet 3

YOICHIRO YANAGIDA
INVENTOR.

BY Wenderoth, Lind & Ponack

ATTYS.

Nov. 18, 1958 YOICHIRO YANAGIDA 2,861,130

AUTOMATIC TELEPHONE CALLING APPARATUS

Filed July 10, 1953 6 Sheets-Sheet 4

INVENTOR.
YOICHIRO YANAGIDA
BY Wenderoth, Lind & Ponack
ATTYS.

YOICHIRO YANAGIDA
INVENTOR.
BY Wenderoth, Lind and Ponack
ATTYS.

AUTOMATIC TELEPHONE CALLING APPARATUS

YOICHIRO YANAGIDA
INVENTOR.

BY Wenderoth, Lind & Ponack

ATTYS.

2,861,130

AUTOMATIC TELEPHONE CALLING APPARATUS

Yoichiro Yanagida, Tochigi-ken, Japan

Application July 10, 1953, Serial No. 367,138
Claims priority, application Japan August 23, 1952
4 Claims. (Cl. 179—90)

This invention relates to a telephone system or, particularly, to a calling apparatus used therein.

The apparatus of this invention has several groups of relays each having contacts corresponding to the figures of a telephone call number (including an exchange office number). The contacts of each group are connected to contacts of the order corresponding to a telephone call number of the other party. When a switch button is pushed, a selecting drum rotates and intermittent signals corresponding to the telephone call number of the other party are sent out.

An object of the invention is to provide an automatic apparatus capable of keeping the telephone number of other partly and of calling the expected other party by operating a switch button.

Another object of the invention is to omit troubles of rotating the dial as many times as the figures of the calling number (including the exchange office number) as in the hitherto existing apparatus.

Other objects and advantages will be made more clear by the following explanations of the drawings showing the embodiments of the present invention.

Figure 1 shows a small cyilnder of a telephone number indicator used in this invention. The digits 1 to 9 and 0 are represented on the cylindrical surface of said cylinder. Contact points provided on the side of the cylinder are electrically connected with its shaft. The telephone number of the other party is indicated by rotating the cylinder. There are various modifications for rotating the cylinder. Figures A, E and F are respective elevations. Figures A′, A″, B, C, C′ and D are respective side views.

Figures 5′ and 5″ show respective modifications of selecting drums.

The mechanism of the apparatus of this invention consists of the following two parts:

(*a*) The part which indicates a telephone number and at the same time keeps the electric energy source connected to a circuit corresponding to the same number and (*b*) The part which sends out intermittent electric currents the required number of times to the dial telephone exchange.

Figure 3:
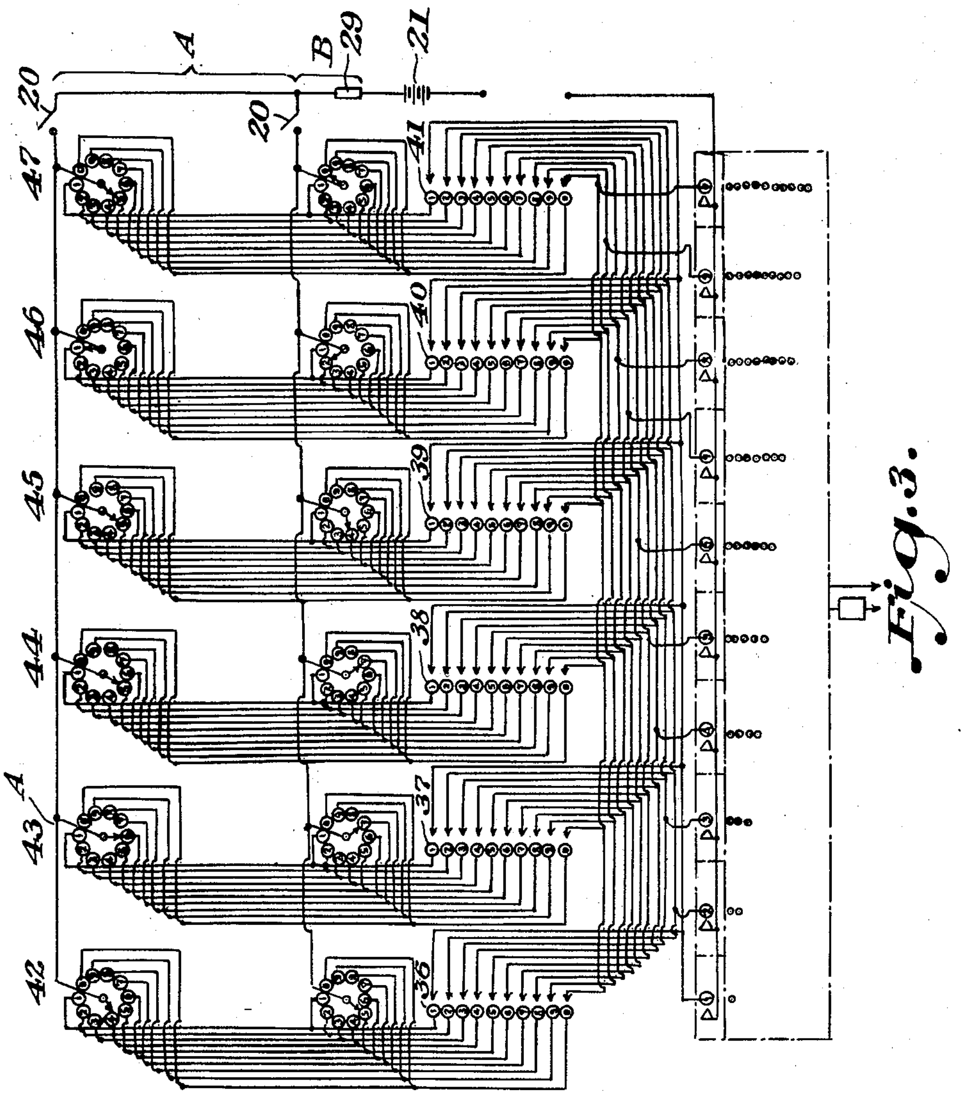
Figure 3 is an electrical wiring diagram of this invention.
Figure 4:
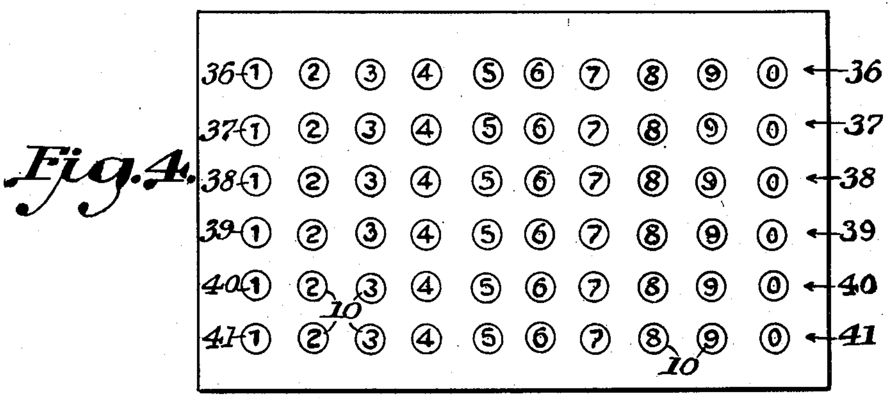
Figure 4 is a view showing the contact points of contact plates in the electric circuit of this invention.
Figure 5:
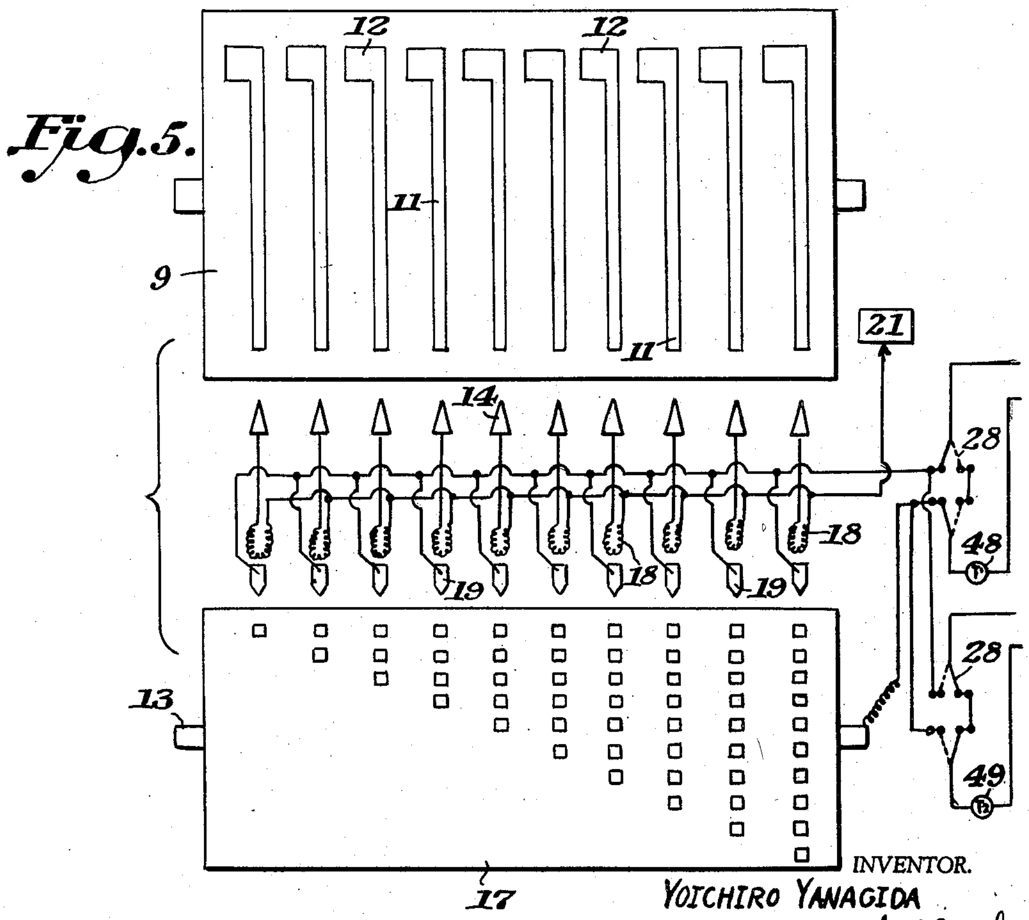
Figure 6:
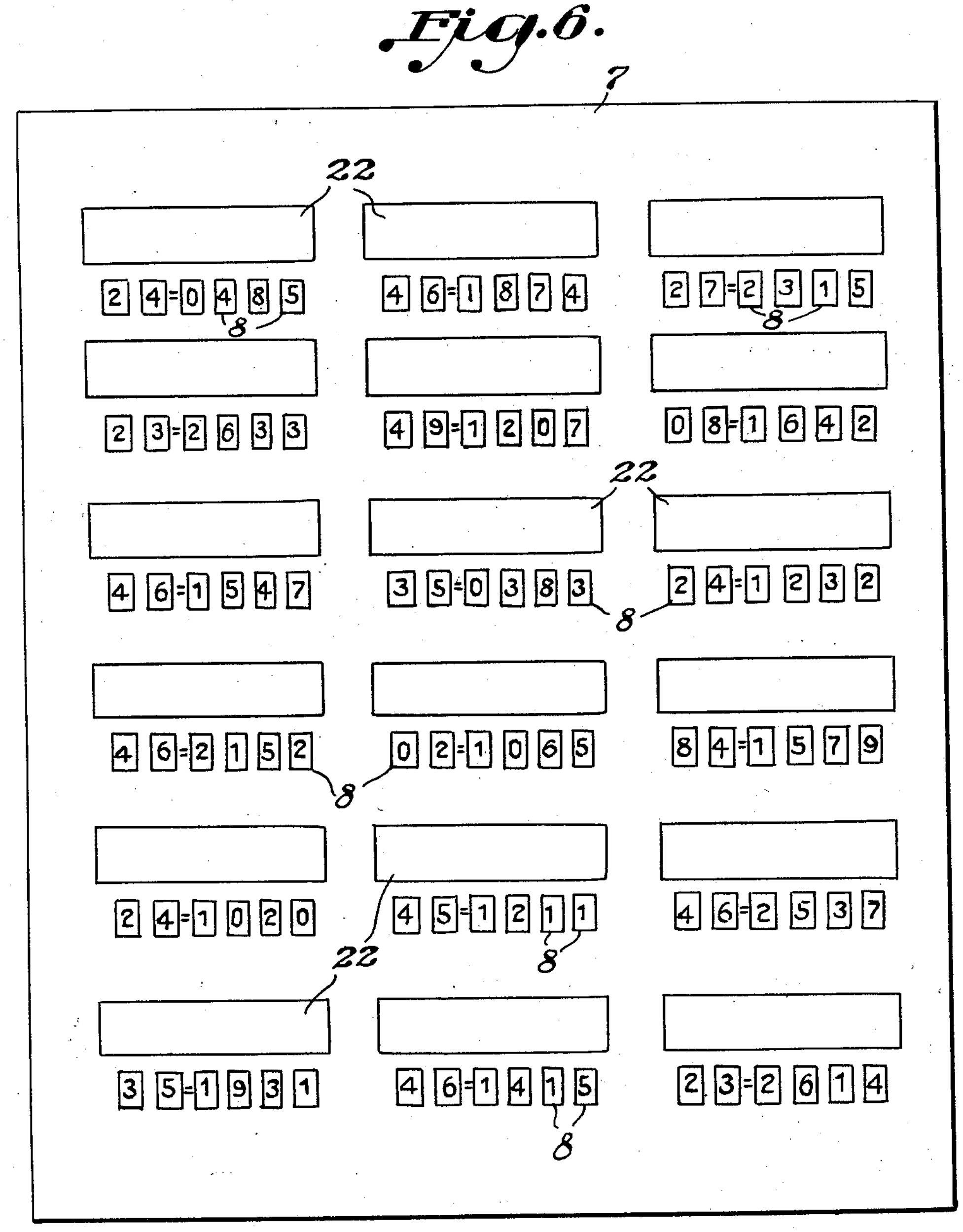
Figure 6 is a plan view of the automatic telephone calling apparatus of this invention.
Figure 9:
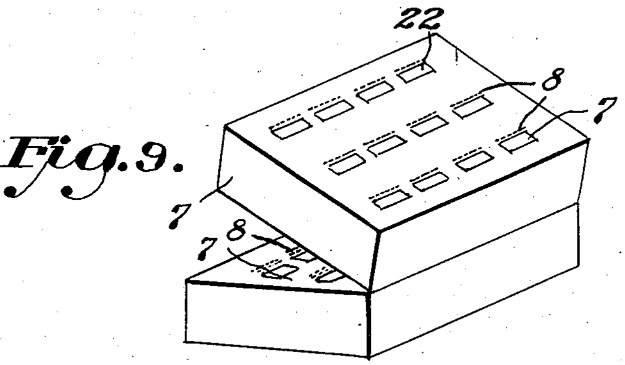
Figures 7, 8, 9 and 10 show respective modifications of the calling apparatus.
Figure 7:
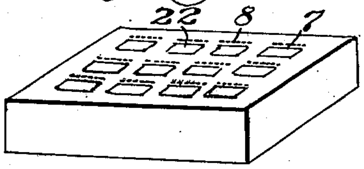
Figure 10:
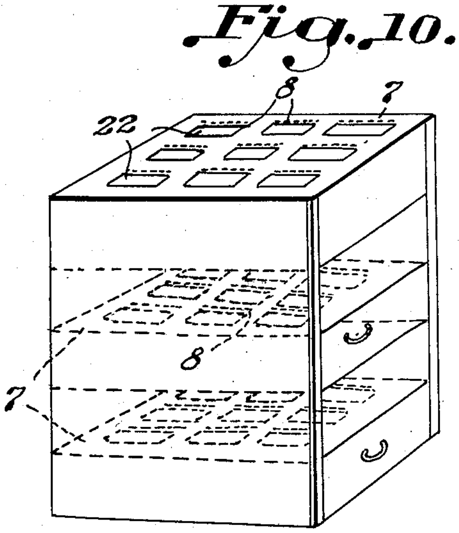
Figure 8:
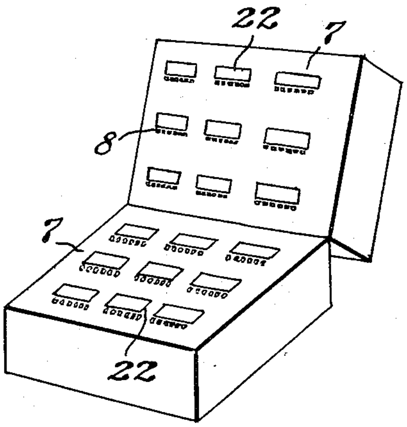

Figures 1, 2, 3, 4 and 7 show the part mentioned in the above paragraph (*a*) and Figure 6 shows a modification. Figures 4 and 5 show the part mentioned in the above paragraph (*b*) and Figures 5B, C and D show modifications.

Now this invention shall be explained with reference to the drawings. Cylinder 1 is for indicating respective figures of a telephone number and is made of an insulator. Contact points 3 on the side are connected with center shaft 2 and both the shaft and contact points are made of a conductor. Contact points 3 as shown in the drawing project from the cylinder but they need not always project. In case the center shaft 2 is made of an insulating material, a conductive contact wheel 5 may be provided around center shaft 2 as shown in Figure 1E and electrically connected with contact point 3 or a lead wire may be put in insulating center shaft 2 and led out. A hole or recess may be provided in the center of cylinder 1 to rotatably support it and contact point 3 may be electrically connected with the outside.

Digits 1, 2, 3, 4, 5, 6, 7, 8, 9 and 0 in the order mentioned and a non-contact character showing the position where contact point 3 is not in contact with any of number contact points 4 to be mentioned later are represented on the cylindrical surface of cylinder 1. Depending on the telephone system to be used, characters other than digits may be represented or the digits may be increased or decreased. The characters or digits may be in two figures by providing contact points 3 and number contact points 4 on both sides of cylinder 1.

Figure 1A:
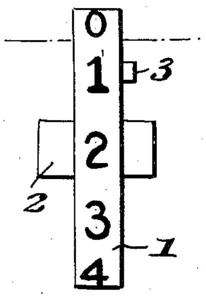
Figure 1A:
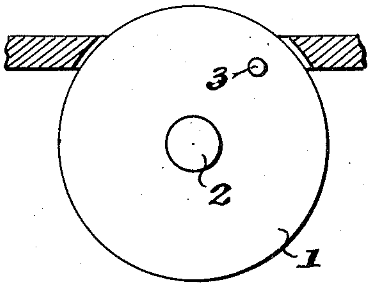
Figure 1A:
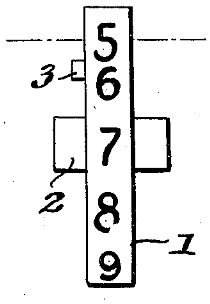
Figure 1B:
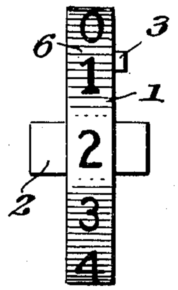
Figure 1C:
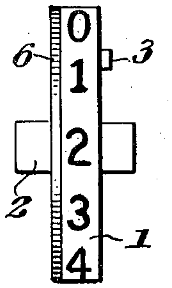
Figure 1C:
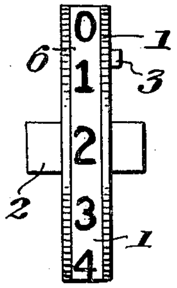
Figure 1D:
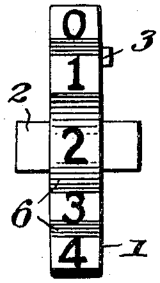
Figure 1E:
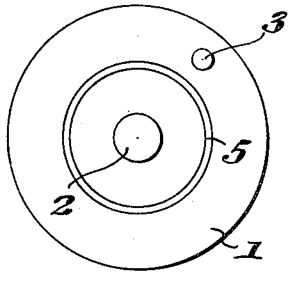
Figure 1F:
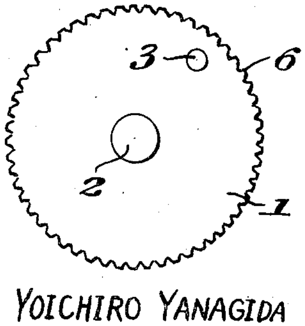

Cylinder 1 may be provided with knurls 6 as shown in Figures 1B, CC′ and D for ease of rotation.

As many cylinders 1 as the figures in a telephone call number are arranged in parallel at a fixed interval. For example, in the case of Tokyo, six figures are used. The number contact points 4 to be brought into contact with contact point 3 of each cylinder 1 are 42, 43, 44, 45, 46 and 47, respectively, from the first line contact points. Cylinder 1 with the characters thereon appears through window 8 in surface plate 7. Six of such cylinders are arranged in parallel to indicate six-figure numbers. Address indicating plate 22 and switch 20 are provided near the cylinders or else addresses may be represented on the surface of a switch. Ten number contact points 4 are arranged in a position where contact with contact point 3 can be obtained on the side of each cylinder 1. Contact point 3 is made to come into contact with the number contact point corresponding to the digit on small cylinder appearing through window 8. For example, when "5" is indicated in window 8, contact point 5 is set to be in contact with the fifth number contact point as shown in Figure 2 in which chain line 34 shows the level of window 8 and chain line 35 shows the mutual contact.

Figures 2, 5:
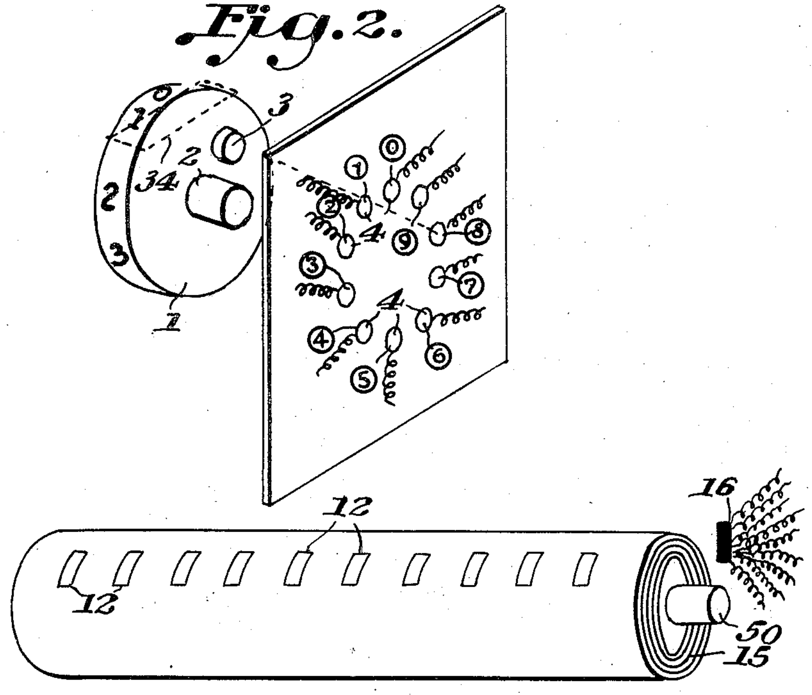
Figure 2 is a view showing the relation between the telephone number indicating cylinder shown in Figure 1 and the contact points on its side.
Figure 5 is a wiring diagram of a part of the electric circuit of this invention including two drums for making and breaking contacts.
Figure 5:
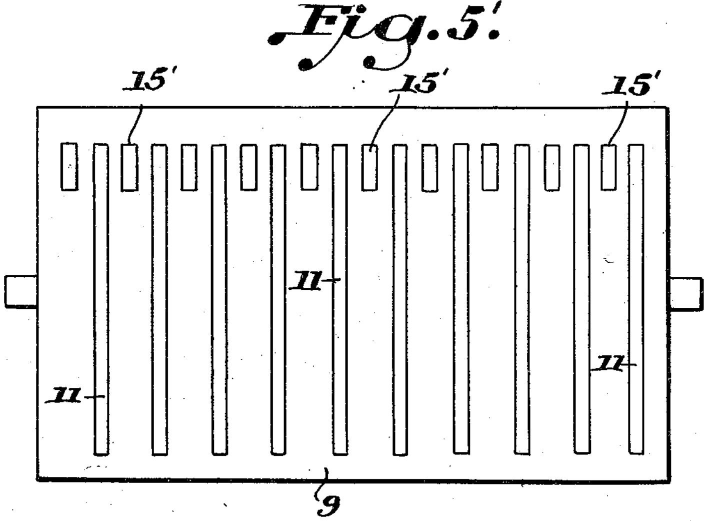

Number contact points 4 for each cylinder 1 are each electrically connected with contact switch 10 of a selecting contact plate which is concentric with and spaced from the surface of a selecting drum so as to be in contact with the surface of selecting drum 9 in Figure 5. That is to say, the number of contact points belonging to the first cylinder are respectively connected with switches 1, 2, 3, 4, 5, 6, 7, 8, 9 and 0 on top stage 36 of the selecting contact plate shown as developed in Figure 4. The number contact points belonging to the second cylinder are connected with respective switches on stage 37 in the second line from top. Likewise, the numbered contact points belonging to each cylinder are connected with respective contact switches on succeeding lines.

Selecting drum 9 is made of an insulating material and ten key-shaped plates made of a conductor are fixed on the surface thereof. The end of top 12 is on a straight line parallel to the axis 50. Longitudinal rectangular part 11 is at right angles with axis 50. Said top 12 is made to come into contact with each vertical row of contact switches 10 in each line of the selecting contact plate. Longitudinal rectangular part 11 is in contact with corresponding switch 14. As shown in Figure 5″, the top is separated from longitudinal rectangular part 11 as in 15′ and may be electrically connected inside the drum. Further, in a modification, as shown in Figure 5′, only top 12 is exposed on the surface of drum 9 and is respectively electrically connected with ten concentric conductors 15 on the side of the drum. Said concentric conductors are in contact with respective corresponding switches 16 which are in this case connected with respective circuits corresponding to said switches 14.

Exchange switch 28 is provided in the telephone line circuit and is closed by disengaging the receiver of the speaker's telephone apparatus 48 or 49. In the drawings, two telephones are shown for convenience but, in fact, any number of telephones can be connected. An auxiliary circuit is provided so that the contact point may move toward the circuit including drum 17 when electric currents flow in the circuit including relay 29 by closing switch 20. In this structure, the contact point of exchange switch 28 which has once moved returns to the original position only by the action of the auxiliary circuit between it and selecting drum 9 mentioned later.

An auxiliary circuit is provided for exchange switches 28 wherein, when exchange switch 28 in respect of a telephone apparatus, for example, 48 is connected with a circuit including drum 17, even if the receiver of the other telephone apparatus, for example 49 of the same speaker line is connected and electric currents are made to flow in the circuit including the telephone (49), exchange switch 28 in respect of this telephone apparatus 49 is not connected with the circuit including drum 17 and communicates directly with the external line without passing through this set. Another auxiliary circuit is provided wherein, when selecting drum 9 has completed the necessary rotation, which is usually one rotation, exchange switch 28 is connected with the contact point on the opposite side and the whole circuit in this automatic telephone calling apparatus is separated from the circuit connecting the telephone apparatus of the other party with telephone apparatus 48 of the speaker here.

There is provided a circuit which starts an electric motor which rotates selecting drum 19 and pulse dispatching drum 17 through relay 29 directly and indirectly when the circuit is closed by pushing switch 20. Selecting drum 9 rotates and then cuts the circuit. There is provided a device wherein selecting drum 9 rotates quickly through the necessary angle (which is an angle between contact of the top of the conductor and the next line of the contact switch) as drum 17 makes one rotation. Pilot lamp 30 may be provided to clearly indicate that electric currents are flowing through switch circuit 20. An auxiliary device is provided whereby it is futile to try to close another switch 20 until selecting drum 9 completes one rotation after switch 20 is closed and selecting drum 9 and drum 17 start to rotate. It is convenient in the case of expanding the equipment to provide in advance an extension line in the course of the circuit from the group of number contact points 42, 43, 44, 45, 46 and 47 to contact switches 36, 37, 38, 39, 40 and 41 of the selecting contact plate.

The method of using of the automatic telephone calling apparatus of this invention shall be explained in the following. First of all, figures (normally six) corresponding to the telephone number of the other party are indicated in window 8 by rotating cylinders 1 appearing in window 8 of surface plate 7. Then, the contact point 3 of the first cylinder comes into contact with the number contact point corresponding to the first digit on the left of the telephone number. For example, in the case shown in Figure 2, the digit of "5" appears in window 8 and contact point 3 is in contact with the fifth number contact point. Thus, the second, third, fourth, fifth and sixth cylinders are respectively in contact with the number contact points corresponding to the digits of the telephone number. The name of the addressee of the telephone number is indicated in name holder 22 corresponding to window 8. This may be indicated on switch 20 at the same time as mentioned above. Name holder 22 may be provided at any position as well as at the position shown in the drawing in respect of window 8. There are provided as many of such telephone number indicating devices as are necessary, in the manner as shown in Figures 7, 8, 9, 10 and 11 or in any other manner. Now, in order to telephone, when switch 20 corresponding to the other party to be called is pushed, the circuit for the purpose as shown in Figure 3 is closed. By taking off the speaker's telephone, electric currents are made to flow between the telephone circuit including the speaker's telephone 48 or 49 and the external line and, by the already mentioned auxiliary circuit, exchange switch 28 connects the circuit including drum 17 with the contact point. One end of switch 20 reaches electric source 21 (of alternating or direct currents) and the other end thereof reaches contact point 3 through center shaft 2 of each of six cylinders forming a unit or through contact wheel 5 equivalent thereto. This contact point 3 is connected in advance with number contact point 4 of the same number as the digits appearing in window 8 as clear from the already mentioned structure and is therefore connected with contact switch 10 of the selecting contact plate through number contact point 4 in each line from first line number contact point group 42 down to sixth line number contact point group 47 through electrical source 21. That is to say, said contact point is connected with each contact switch of the number corresponding to the digits of the telephone number in each line of the contact switch group of each line.

As soon as switch 20 is pushed, selecting drum 9 and drum 17 start rotation, and conductor top 12 on selecting drum 9 comes into contact with first line contact switch group 36. Only the switches with which contact point 3 of cylinder 1 is in contact communicate with the electric source and energize telephone circuit switch 18 from corresponding switch 14 or 16 through longitudinal rectangular part 11 and, by such action, contact rod 19 is brought into contact with the surface of drum 17. One end of this contact rod 19 is connected with one end of the telephone circuit. The other end of said rod is connected with the other end of the electric circuit from the surface contact point of drum 17 through its rotary shaft 13. Therefore, by the rotation of roller 17, intermittent electric currents of the number corresponding to the digit of the first figure of the wanted telephone number are delivered to the telephone circuit. When drum 17 makes one rotation, selecting drum 9 rotates through an angle, its top 12 comes into contact with the second line contact switch group 37 on the selecting plate, previous contact rod 19 returns to the original position, contact is broken, electric currents flow in one of contact switches in the second line, contact rod 19 belonging to said line comes into contact with drum 17 and as many intermittent currents as required are delivered.

In the same manner, intermittent currents are automatically sent to all the figures down to the last and the telephone of the other party can be called by the automatic exchange apparatus of the station. When selecting drum 9 is rotated and the last delivery of the intermittent currents is completed, the rotation stops, switch 20 returns to the original position and the whole circuit opens, and, by the action of exchange switch 28, this automatic telephone calling apparatus is separated from the circuit connecting the speaker's telephone with the telephone of the other party. Therefore, the telephone of another party can be called by connecting this automatic telephone calling apparatus with the circuit of the speaker's second telephone 49.

I claim:

1. An automatic telephone calling apparatus comprising a plurality of telephone number indicators in the form of a plurality of cylinders each having a plurality of indicating references on the cylindrical surface thereof, and having a contact point on the side thereof, a plurality of contacts, one corresponding to each of the indicating references, said contacts being positioned adjacent said cylinder adapted to be contacted by said contact point, a contact plate having a plurality of lines of contact points, one corresponding to each of said plurality of cylinders, each line having a plurality of contact points corresponding to the number of contacts adjacent said cylinders and each contact in each line electrically connected to the corresponding contact point adjacent one of said cylinders, a selector comprising a selecting drum rotatably mounted concentrically within said contact plate and having a line of plate contacts on the surface thereof parallel to the axis of said drum each contacting one contact in a line of contacts on said contact plate, and means for rotating said drum to bring said plate contacts into contact with the next line of contact points on said contact plate, a plurality of contact rods one electrically connected to each plate contact on said drum, an electric pulse dispatching drum rotatably mounted adjacent said contact rods in contact therewith and having a plurality of plate contacts arranged in groups about the circumference of said pulse dispatching drum, the number of contacts in each group corresponding to one of the indicating references on said cylinders, one group for each contact rod, said pulse dispatching drum being electrically connected to a telephone line to a dial telephone exchange, means for rotating said pulse dispatching drum one revolution for each movement of said selector drum, energizing means for said apparatus for electrically energizing the contact point on each of said cylinders, and switch means connecting said energizing means to each of said cylinders.

2. An apparatus as claimed in claim 1 in which the indicating reference bearing cylindrical surface of said cylinders has at least a portion thereof knurled, and a central shaft about which said cylinders rotate, said shaft being electrically connected to the contact points on said cylinders and to said energizing means.

3. An apparatus as claimed in claim 1 in which said selector drum has a plurality of contact rings offset from said plate contacts thereon, said plate contacts being electrically connected to said rings, and said rings being contacted by said contact rods.

4. An apparatus as claimed in claim 3 in which said contact rings an dplate contacts on said selector drum are electrically connected along the surface of said drum.

References Cited in the file of this patent

UNITED STATES PATENTS

| | | |
|---|---|---|
| 1,097,644 | Kaisling | Mar. 26, 1914 |
| 2,172,579 | Heron | Sept. 12, 1939 |
| 2,395,539 | Dowey | Feb. 26, 1946 |
| 2,537,188 | Kaelin | Jan. 9, 1951 |
| 2,561,298 | Vanheerswinghels | July 17, 1951 |
| 2,576,189 | Olliver | Nov. 27, 1951 |